UNITED STATES PATENT OFFICE.

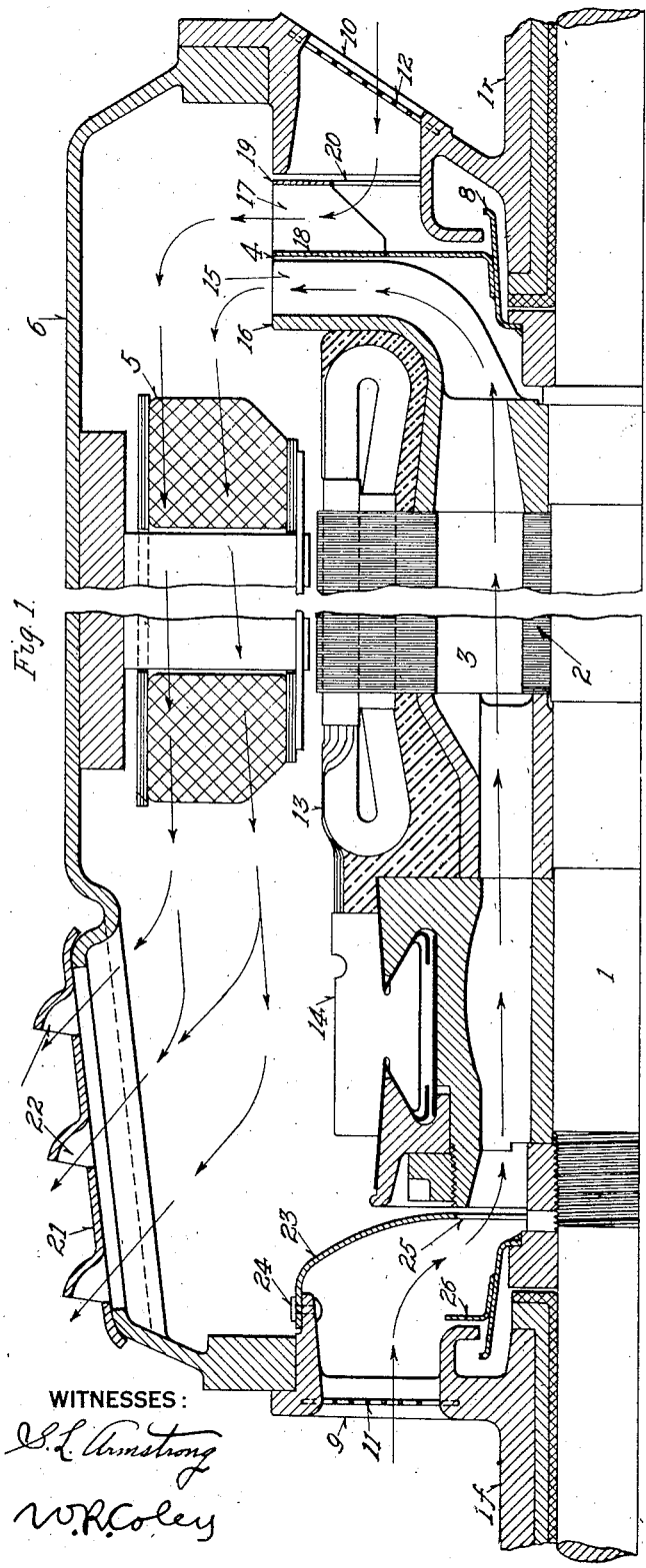

RUDOLF E. HELLMUND AND CHARLES W. STARKER, OF PITTSBURGH, PENNSYLVANIA, ASSIGNORS TO WESTINGHOUSE ELECTRIC AND MANUFACTURING COMPANY, A CORPORATION OF PENNSYLVANIA.

DYNAMO-ELECTRIC MACHINE.

1,261,386.  Specification of Letters Patent.  Patented Apr. 2, 1918.

Application filed December 4, 1914. Serial No. 875,455.

*To all whom it may concern:*

Be it known that we, RUDOLF E. HELLMUND, a subject of the German Empire, and a resident of Pittsburgh, in the county of Allegheny and State of Pennsylvania, and CHARLES W. STARKER, a subject of the German Empire, and a resident of Pittsburgh, in the county of Allegheny and State of Pennsylvania, have invented a new and useful Improvement in Dynamo-Electric Machines, of which the following is a specification.

Our invention relates to dynamo-electric machines, and it has special reference to the internal ventilation thereof under operating conditions.

One object of our invention is to provide a simple and compact means for effectively and reliably ventilating dynamo-electric machine parts when the rotor is in operation.

Another object of our invention is to provide a novel and effective method for adequately ventilating all parts of dynamoelectric machines whereby the maximum temperature is kept low and a small difference in temperature between any two points in the machines is maintained.

In the prior art, many types of dynamoelectric machines have employed one of the two following ventilating methods: first, drawing in a cooling current at one end of the machine and discharging it at the other end after passage through ducts in the rotatable member, the ventilation of the stator being neglected or being effected, to some degree, by reason of receiving pre-heated air from radially-extending ducts in the rotor; and second, taking in a ventilating current at one end of the machine, passing it successively through the rotor and the stator, or vice versa, and then discharging the heated current at the same end of the machine. In either case, the best ventilation that some portion of the machine received was by heated air from the other machine parts, this portion thus imposing a limit upon the capacity of the entire machine.

Inasmuch as, for various commercial and operating reasons, it is desirable to maintain the size of rotors as small as possible while still providing ample volume of copper and iron, the ventilating ducts of the rotors are necessarily small and, consequently, only a restricted and, in many cases, inadequate, amount of air can be drawn through these ducts.

According to one form of our present invention, we provide a dynamo-electric machine having associated with one end of the rotor a double set of fan blades which, in effect, constitute unitary independent fans, one being adapted to draw a ventilating current from one end of the machine through a plurality of longitudinally-extending ducts in the armature, and the other fan being adapted to draw an independent parallel ventilating current from some directly accessible point, as the other and adjacent end of the machine; the fans being also collectively adapted to force relatively large quantities of relatively cool air through the field magnet structure, as well as through the armature. One ventilating current thus follows a loop through the entire machine, while, near the mid-point of the loop, a fresh and independent current of cooled air is combined with the first current to ventilate the field structure. The body of heated air, after passing the armature, is thus materially cooled, and the temperature gradient in, and ultimate temperature of, the machine parts are maintained at desirably low values, inasmuch as the ventilation of the stator does not depend upon the passage of a restricted amount of heated air from the rotor.

In this way, in addition to the ventilation of the rotor core, machines of the commutator type may have their commutators effectively cooled by the air currents which respectively pass within and around the commutators. To prevent interference between the incoming and outgoing ventilating currents at the one end of the machine, a partition member is suitably placed within the machine frame, whereby no air passes directly from the atmosphere to the outer commutator surface, thereby effectually obviating trouble from the deposit of dirt or other foreign matter on the commutator, which deposit has been a disadvantage of some older machines.

In another form, our invention includes a system wherein double fan means are employed upon the rotors of dynamo-electric machines, one set of fan blades being adapted to draw a ventilating current through rotor ducts, and a second set being adapted to induce an additional parallel-moving current through the stator, the resultant current being discharged at a point intermediate their points of ingress. This type of complete motor ventilation constitutes an extension of an old hereinbefore-mentioned type of rotor ventilation and becomes possible by the use of double fan means constructed according to our invention.

In the accompanying drawings, Figure 1 and Fig. 2 are views, in longitudinal section, of half-portions of dynamo-electric machines embodying our invention; and Fig. 3 is a view in end elevation, of a portion of the apparatus illustrated in Fig. 2.

Referring to Fig. 1 of the drawing, the structure here shown comprises a centrally-disposed rotor shaft 1 that is provided with suitable end bearing members 1$^f$ and 1$^r$, and upon which is assembled a laminated core member 2 that is provided with ducts 3 longitudinally extending therethrough and with a fan member 4; a field magnet structure 5 of any familiar form; and an incasing frame member 6.

The shaft 1 is preferably provided with suitable oil-throwing projections 8 that are located in proximity to the bearing members 1$^f$ and 1$^r$, respectively, in accordance with customary practice, and the bearing members are respectively provided with end openings 9 and 10 which may be suitably covered with ventilating screens 11 and 12.

The core member 2 may, in general, be of any familiar type embodying a plurality of insulated coils 13 that are severally connected to a plurality of commutator bars comprising a commutator cylinder 14. The fan member 4 comprises a set of fan blades 15 that are suitably spaced around the rear wall 16 of the core member 2, and a second and substantially independent set of relatively small fan blades 17 that are suitably secured between an annular partition member 18 that is disposed adjacent to the rear end of the fan blades 15, and the inner edge of which may be suitably attached to the oil-throwing projection 8, and an annular rear supporting member 19 that is provided with a suitable centrally-disposed aperture 20, substantially registering with the ventilating opening 10 in the bearing member 1$^r$.

The frame member 6 is provided with a suitable cover member 21 above the commutator cylinder 14, and a plurality of discharge openings 22 are preferably disposed in the cover member 21.

For preventing interference between the in-coming and out-going ventilating currents, as hereinafter more fully set forth, a suitably dished annular member 23 is secured to the bearing member 1$^f$ by means of a plurality of suitable rivets or bolts 24 at the commutator end of the machine, and is provided with a suitable centrally-disposed opening 25 that substantially registers with the commutator-end openings of the longitudinally-extending armature ducts 3. A second annular member 26, preferably angular in section, may be secured to the oil-throwing projection 7 to insure a smooth passage of the ventilating current through the opening 9 to the armature ducts 3.

The method of ventilating the dynamo-electric machine shown may be described as follows: One ventilating current is taken into the machine through the opening 9 between the annular partition members 23 and 26, through the armature ducts 3, and between the fan blades 15 to the space surrounding the field magnet structure 5, this current being induced by means of the set of fan blades 15. Simultaneously, a second and independent parallel ventilating current is drawn in by the second set of fan blades 17 through the end opening 10 and the opening 20 in the rear supporting member 19, between the fan blades 17 and into the space surrounding the field magnet structure 5. The combined action of the two sets of fan blades then forces the materially cooled combined currents through the field magnet structure 5, over the commutator cylinder 14 and out through the openings 22 in the cover member 21 of the frame 6. The general directions of the air currents are indicated by the arrows.

Reference may now be had to Figs. 2 and 3, which disclose our ventilating system as applied to another type of dynamo-electric machine, viz: an induction motor. The apparatus illustrated comprises a centrally-located shaft member 30, upon which is rigidly mounted a laminated rotor core 31 having a suitable winding 31$^w$ and a plurality of longitudinally-extending ducts 32; a plurality of collector-rings 33$^r$ that are suitably connected (not shown) to the winding 31$^w$; a laminated inclosing stator member 33 having a suitable winding 33$^w$; a substantially cylindrical incasing frame member 34 having a plurality of ventilating openings 35; a plurality of end-bells 36 and 37 for respectively inclosing the front and the rear ends of the machine and respectively provided with ventilating inlet openings 36$^a$ and 37$^a$; and our double fan means 38.

All of the apparatus illustrated, with the exception of the fan means 38, is old in the art, and various familiar types of construction may be employed; consequently, no further description of these old parts is deemed necessary.

The fan means 38 comprises a suitable ring member 39 that is rigidly secured to the shaft 30, an annular partition plate or base member 40 that may be attached to the ring member 39 in any suitable manner, as by a plurality of bolts 41; a set of fan blades 42 that are suitably secured to the inner side of the plate 40; and a second set of fan blades 43 that are appropriately attached to the outer side of the plate 40, preferably in staggered relation to the blades 42, as clearly shown in Fig. 3. The fan means 38 thus, in effect, constitutes two independent fans, and each creates a ventilating current independently of the other, as about to be described.

The operation of our ventilating system in the machine of Fig. 2 may be set forth as follows: One main ventilating current enters the end-bell openings 37ª, passes through the ducts 32 of the rotor to the set of fan blades 42 and then over the adjacent surface of the stator 33 to the outlets 35 in the frame member 34. The second and independent main ventilating current is drawn in through the end bell openings 36ª by the fan having the blades 43, thence passes over the stator 33 to join the returning first current, and is discharged through the frame openings 35. In addition, an auxiliary ventilating current is drawn, by the aspirating effect of the outgoing main currents, from the end-bell opening 37ª directly over the adjacent stator portions to the outlets 35. The various arrows indicate, in general, the paths of the several ventilating currents.

We do not wish to be restricted to the specific structural details or arrangement of parts herein set forth, as modifications thereof may be made within the spirit and scope of our invention. We, therefore, desire that only such limitations shall be imposed as are indicated in the appended claims.

We claim as our invention:

1. The combination with a dynamo-electric machine having a coöperating stator and rotor, at least one of which is provided with a plurality of ventilating ducts, and a current-collecting surface, of a multi-part fan, one part of which is adapted to draw a ventilating current from one end of the machine through said ducts and return the current through other machine parts to the atmosphere at said end, and the other part of which is adapted to draw another ventilating current from the fan end of the machine and cause it to join said returning first current, the combined currents passing over said current-collecting surface.

2. The combination with a dynamo-electric machine having a field magnet structure and a coöperating commutator-type armature provided with a plurality of longitudinally-extending ducts, of a plurality of independent sets of fan blades disposed on the rear end of the armature, one set being adapted to draw air from the commutator end through said ducts and return it through the field magnet structure to pass out at the commutator end, and the other set being adapted to draw air from the rear end and to effect a combination thereof with the said returning first current.

3. The combination with a dynamo-electric machine having a field magnet structure and a coöperating commutator-type armature provided with a plurality of longitudinally-extending ducts, of a plurality of independent sets of fan blades disposed on the rear end of the armature, one set being adapted to draw air from the commutator end through said ducts and return it through the field magnet structure to pass out at the commutator end, and the other set being adapted to draw air from the rear end and to effect a combination thereof with the said returning first current, and means disposed within the commutator end of the machine to prevent interference of the incoming and outgoing currents.

4. The combination with a dynamo-electric machine having a field magnet structure and a coöperating commutator-type armature provided with a plurality of longitudinally-extending ducts, of a plurality of independent sets of fan blades disposed on the rear end of the armature, one set being adapted to draw air from the commutator end through said ducts and return it through the field magnet structure to pass out at the commutator end, and the other set being adapted to draw air from the rear end and to effect a combination thereof with the said returning first current, and an annular dished member disposed within the commutator end of the machine to guide the incoming current to said ducts and to prevent interference of the incoming and outgoing currents.

5. The combination with a dynamo-electric machine having a field magnet structure and a coöperating armature provided with a commutator cylinder and a plurality of longitudinally-extending ducts, of a set of fan blades disposed on one end of the armature for drawing a ventilating air current from one end of the machine through said ducts, and a second set of fan blades disposed adjacent to said first set and adapted to add a relatively cool ventilating air current from the adjacent end of the machine to the first current after it passes the armature, both of said sets of fan blades being adapted to force the cooled combined currents through the field magnet structure, and over the surface of the commutator cylinder.

6. A dynamo-electric machine having a field magnet structure and a coöperating armature provided with a commutator cylinder and a plurality of longitudinally-extending ducts and embodying a double set of fan blades secured to one end of the armature, one set being adapted to draw air from one end of the armature through said ducts and to return the air through the field structure and over the surface of the commutator cylinder, and the other set being adapted to force air from the other end of the machine through the field structure and over the surface of the commutator cylinder.

7. A dynamo-electric machine comprising coöperative stator and rotor elements and means for providing the following ventilating paths: from one end of the machine through both elements and over one element thereof in succession and from the other end of the machine through one element and over one element thereof.

8. A dynamo-electric machine comprising a field magnet structure, a coöperating armature having a plurality of longitudinally-extending ducts, and fan means for effecting ventilation of the machine in the following paths: from one end of the machine successively through the said ducts and through the field magnet structure, and from the other end of the machine through the field magnet structure only.

9. A dynamo-electric machine comprising coöperating stator and rotor elements, and means for drawing air from one end of the machine to alternately come into contact with both elements and for drawing air from the other end of the machine to successively come into contact with both of said elements.

10. A dynamo-electric machine comprising a field magnet structure and a coöperating armature having a plurality of longitudinally-extending ventilating ducts, and a current-collecting surface, a set of fan blades for drawing cooling air from one end of the machine to cool the armature, the field magnet structure and the current-collecting surface in succession, and a second set of fan blades for drawing air from the other end of the machine to cool the field structure and the current-collecting surface only.

11. The method of ventilating a dynamo-electric machine having coöperating stator and rotor elements which consists in causing a cooling current to successively pass through both and over one of said elements, and in simultaneously causing another cooling current to successively pass through one and over the other of said elements.

12. The method of ventilating a dynamo-electric machine having a field magnet structure and an armature provided with a commutator cylinder and a plurality of longitudinally-extending ducts which consists in passing a cooling current from one end of the machine successively through said ducts through the field magnet structure and over the surface of the commutator cylinder, and in simultaneously passing another cooling current from the other end of the machine through the field structure and over the surface of the commutator cylinder.

In testimony whereof, we have hereunto subscribed our names this 30th day of Nov., 1914.

RUDOLF E. HELLMUND.
CHARLES W. STARKER.

Witnesses:
  A. L. BROOMALL,
  B. B. HINES.